(12) United States Patent
Kikuchi (10) Patent No.: US 12,401,753 B2
(45) Date of Patent: Aug. 26, 2025

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Takazumi Kikuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 296 days.

(21) Appl. No.: 17/899,597

(22) Filed: Aug. 30, 2022

(65) Prior Publication Data
US 2023/0291855 A1   Sep. 14, 2023

(30) Foreign Application Priority Data
Mar. 11, 2022   (JP) ................. 2022-038630

(51) Int. Cl.
*G06K 15/00*   (2006.01)
*G06K 15/02*   (2006.01)
*H04N 1/00*    (2006.01)

(52) U.S. Cl.
CPC ..... *H04N 1/00931* (2013.01); *H04N 1/00925* (2013.01); *H04N 1/0097* (2013.01)

(58) Field of Classification Search
CPC .......... H04N 1/00931; H04N 1/00925; H04N 1/0097; H04N 2201/0094; H04N 2201/0091; H04N 2201/0093; H04N 2201/0081
USPC ....................................................... 358/1.13
See application file for complete search history.

(56) References Cited

U.S. PATENT DOCUMENTS

| | | | |
|---|---|---|---|
| 6,431,772 B1 | 8/2002 | Melo et al. | |
| 11,036,445 B2 | 6/2021 | Hosoda | |
| 2002/0181022 A1* | 12/2002 | Tokashiki | .......... G06K 15/1859 358/1.18 |

(Continued)

FOREIGN PATENT DOCUMENTS

| | | |
|---|---|---|
| JP | H09146725 | 6/1997 |
| JP | 2003532186 | 10/2003 |

(Continued)

OTHER PUBLICATIONS

IP.com search history (Year: 2025).*

*Primary Examiner* — Moustapha Diaby
(74) *Attorney, Agent, or Firm* — JCIPRNET (57) ABSTRACT

An information processing apparatus includes a processor configured to in a case where an instruction to apply a setting of a second image processing device to a setting of a first image processing device is received, execute an application process of applying a setting of a second virtual image processing device to a setting of a first virtual image processing device, the first virtual image processing device being a virtual device of the first image processing device and being a device having the setting synchronized with the setting of the first image processing device, and the second virtual image processing device being a virtual device of the second image processing device and being a device having the setting synchronized with the setting of the second image processing device.

20 Claims, 10 Drawing Sheets

(56) References Cited

U.S. PATENT DOCUMENTS

| | | | | |
|---|---|---|---|---|
| 2008/0074686 A1* | 3/2008 | Naito | ............... | G06K 15/1814 |
| | | | | 358/1.9 |
| 2010/0118330 A1* | 5/2010 | Feijoo | ............... | G06F 3/1205 |
| | | | | 358/1.15 |
| 2012/0212757 A1* | 8/2012 | Gaertner | ............... | G06F 3/1288 |
| | | | | 358/1.13 |
| 2013/0148155 A1* | 6/2013 | Kitagata | ............... | G06F 3/1272 |
| | | | | 358/1.15 |
| 2013/0151678 A1* | 6/2013 | Fukasawa | ............... | H04L 41/0846 |
| | | | | 709/221 |
| 2016/0036631 A1* | 2/2016 | Shibata | ............... | G06F 11/00 |
| | | | | 709/221 |
| 2017/0214808 A1* | 7/2017 | Yun | ............... | H04N 1/00228 |
| 2019/0098168 A1* | 3/2019 | Uchida | ............... | H04N 1/32673 |
| 2019/0306371 A1* | 10/2019 | Nishida | ............... | H04N 1/4413 |
| 2020/0012469 A1* | 1/2020 | Hamamoto | ............... | H04N 1/00347 |
| 2020/0133591 A1* | 4/2020 | Kaneda | ............... | G06F 3/122 |
| 2020/0233619 A1* | 7/2020 | Hosoda | ............... | G06F 3/1239 |
| 2022/0107765 A1* | 4/2022 | Arai | ............... | G06F 3/1254 |
| 2022/0156017 A1* | 5/2022 | Inoue | ............... | G06F 3/1287 |

FOREIGN PATENT DOCUMENTS

| | | |
|---|---|---|
| JP | 2012174279 | 9/2012 |
| JP | 2020119016 | 8/2020 |

\* cited by examiner

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-038630 filed Mar. 11, 2022.

BACKGROUND

(i) Technical Field

The present disclosure relates to an information processing apparatus, a non-transitory computer readable medium storing an information processing program, and an information processing method.

(ii) Related Art

JP2012-174279A discloses a printing system having a purpose of providing a seamless access to a printer to a client regardless of a printing protocol used in each printing job.

The printing system includes a printing processing apparatus and a virtual printer. The printing processing apparatus connects a client system and a physical printer to each other by an interface, receives a printing job from the client system, and functions to process the printing job for performing printing by using the physical printer. In addition, the printing processing apparatus includes a printer object that is connected to the physical printer by communication and has a printing function of the physical printer. The virtual printer detects a printing protocol associated with the printing job from the client system. In addition, the virtual printer reconfigures the printing job to process the printing job in accordance with a printing protocol of the physical printer in a case where the detected printing protocol does not coincide with a printing protocol of the physical printer.

JP2020-119016A discloses a printing device for providing a printer having a high probability of acquiring print data by an appropriate protocol in a case where the print data is acquired from a cloud print service.

The printing device is compatible with the cloud print service and includes a unit that acquires information regarding a printer queue associated with the printing device, a unit that acquires user authentication setting information of a printer, a unit that selects one of a plurality of job information acquisition units based on the acquired information regarding the printer queue and the user authentication setting information of the printer, and a unit that acquires a list of job information from a cloud by using the selected job acquisition unit.

SUMMARY

However, the techniques disclosed in JP2012-174279A and JP2020-119016A have a problem that it is not possible to reflect the setting of another image forming device to an image forming device to be used. Such a problem may occur not only in the image forming device but also in another image processing device such as a scanner device.

Aspects of non-limiting embodiments of the present disclosure relate to an information processing apparatus, a non-transitory computer readable medium storing an information processing program, and an information processing method capable of, in a configuration in which an image processing device and a virtual image processing device corresponding to the image processing device synchronize a setting, reflecting setting of the image processing device to the other image processing device to be used.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to in a case where an instruction to apply a setting of a second image processing device to a setting of a first image processing device is received, execute an application process of applying a setting of a second virtual image processing device to a setting of a first virtual image processing device, the first virtual image processing device being a virtual device of the first image processing device and being a device having the setting synchronized with the setting of the first image processing device, and the second virtual image processing device being a virtual device of the second image processing device and being a device having the setting synchronized with the setting of the second image processing device.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present disclosure will be described in detail with reference to the drawings. In the present exemplary embodiment, a case where the technique of the present disclosure is applied to an information processing system that uses, as a target, a plurality of image forming devices scattered in various places including a shared office and on-site, and provides a cloud print service that uses each image forming device as a virtual printer will be described. The "cloud print service" referred here is represented by "UNIVERSAL PRINT", which is a cloud-compatible print service provided by Microsoft Corporation. By using this service, it is possible to perform printing by an image forming device via a cloud even from a terminal device that is a going destination and is not allowed to be connected to a network in which the image forming device is installed.

First Exemplary Embodiment

Figure 1:
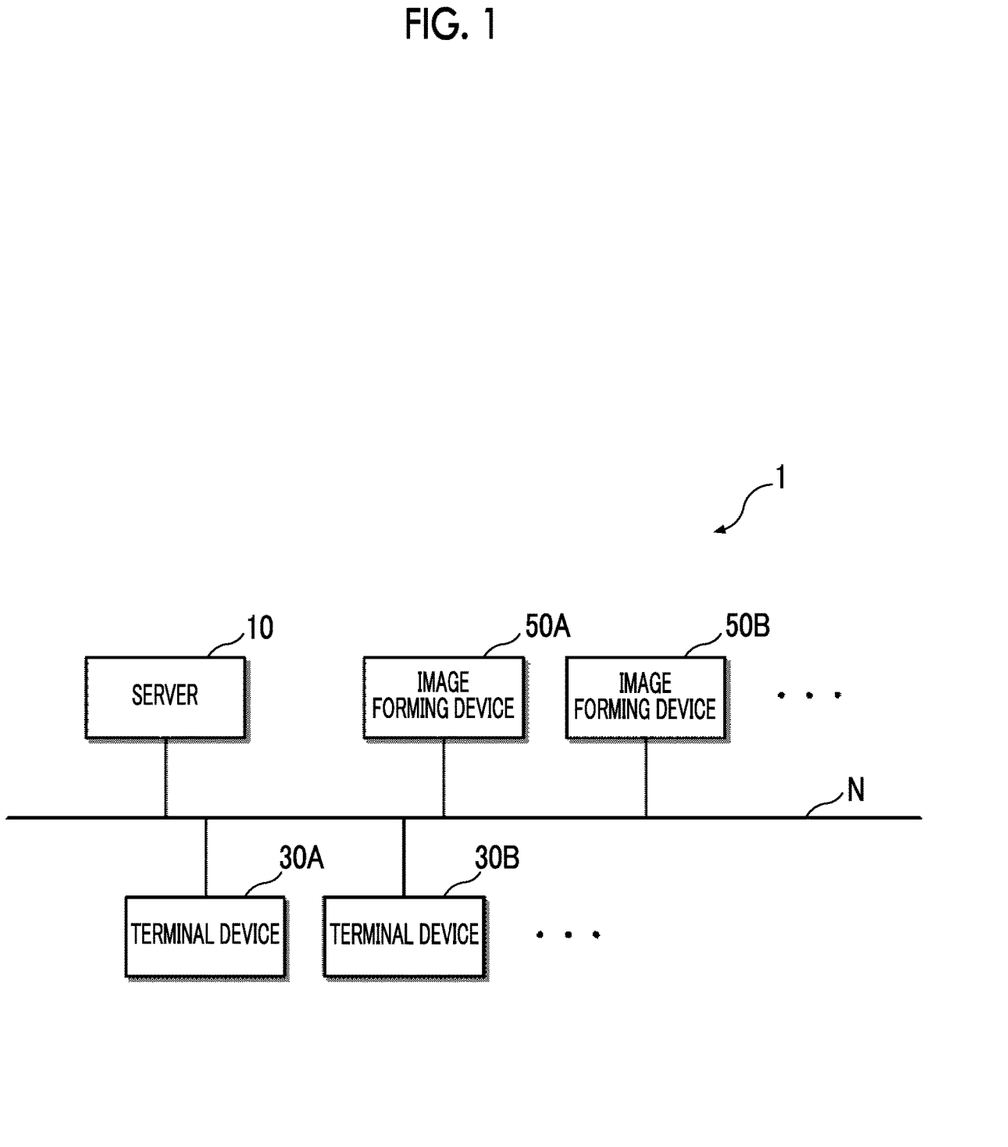
FIG. 1 is a block diagram illustrating an example of a configuration of an information processing system according to an exemplary embodiment of the present disclosure.

First, the configuration of an information processing system 1 according to the present exemplary embodiment will be described with reference to FIG. 1. FIG. 1 is a block diagram illustrating an example of the configuration of the information processing system 1 according to the present exemplary embodiment.

As illustrated in FIG. 1, the information processing system 1 according to the present exemplary embodiment includes a server 10 as an information processing apparatus in the technique of the present disclosure, a plurality of terminal devices 30A, 30B, . . . , and a plurality of image forming devices 50A, 50B, In a case where the terminal devices 30A, 30B, . . . are described without distinguishment, the terminal devices 30A, 30B, . . . are simply collectively referred to as a "terminal device 30" below. In addition, in a case where the image forming devices 50A, 50B, are described without distinguishment, the image forming devices 50A, 50B, . . . are simply collectively referred to as an "image forming device 50" below.

Examples of the server 10 and the terminal device 30 include information processing apparatuses such as a personal computer and a server computer. In the present exemplary embodiment, a digital multifunction device having an image printing function, an image scanning function, an image transmission function, and the like is applied as the image forming device 50. The present disclosure is not limited to this form. A form in which another image forming device such as an image forming device having only an image printing function or an image forming device having only an image printing function and an image scanning function is applied as the image forming device 50 may be made.

All the image forming devices 50A, 50B, . . . are not limited to having the identical specifications. Services that can be performed may vary, items settable in the service may vary, and equipped optional items may vary.

The server 10, the terminal device 30, and the image forming device 50 are connected to each other via a network N. The server 10 is configured so that the server 10 can communicate with the terminal device 30 and the image forming device 50 via the network N.

In the present exemplary embodiment, a combination of a public communication line such as the Internet and a telephone line network and a communication line in a company such as a local area network (LAN) and a wide area network (WAN) is used as the network N, but the present disclosure is not limited to this form. For example, a form in which only one of the above public communication line and the communication line in the company is applied as as the network N may be made. Further, in the present exemplary embodiment, the wired and wireless communication lines are applied as the network N, but the present disclosure is not limited to this form. A form in which only one of the wireless communication line and the wired communication line is applied may be made.

Figure 2:
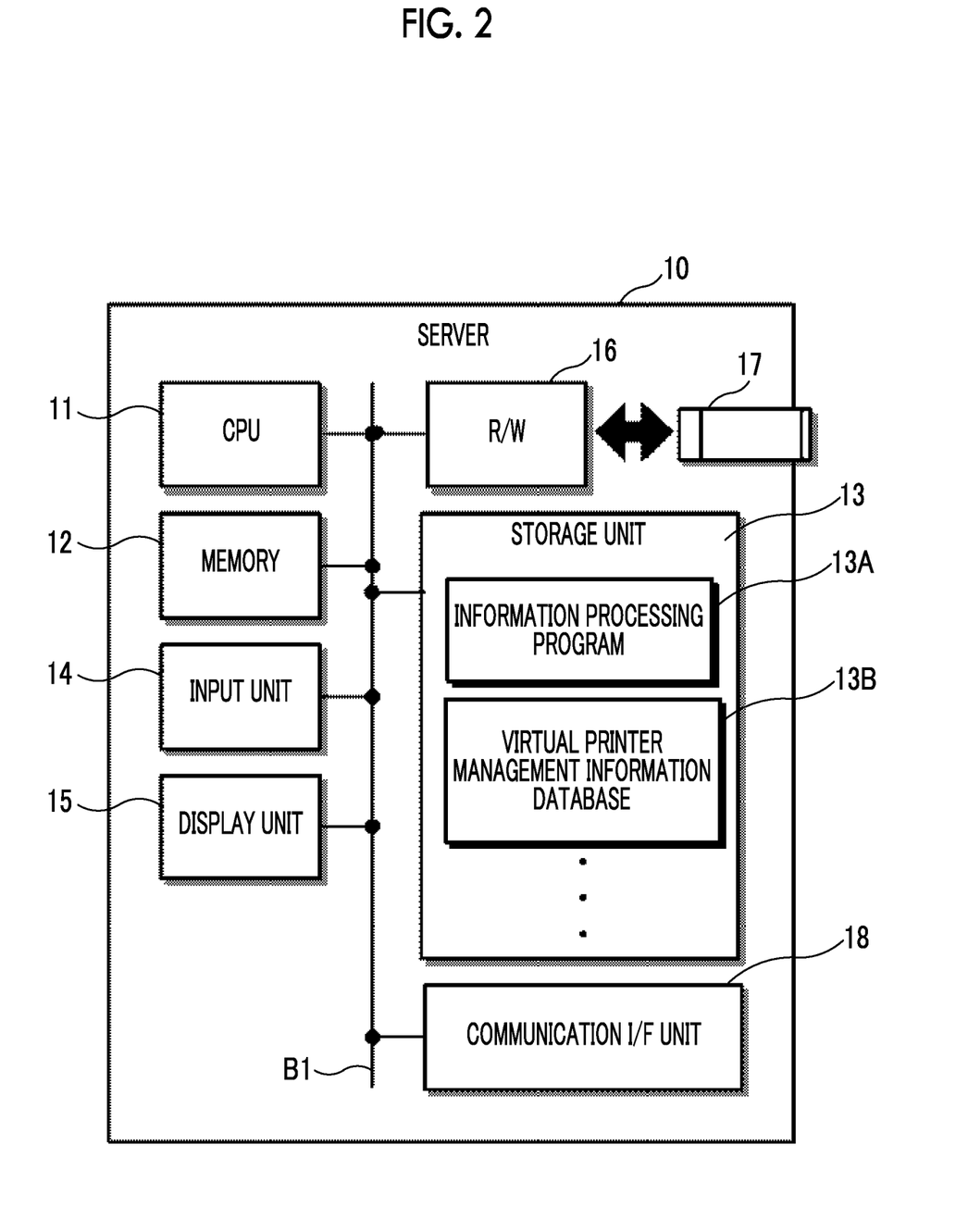
FIG. 2 is a block diagram illustrating an example of a hardware configuration of a server according to the exemplary embodiment of the present disclosure.

Next, the configuration of the server 10 according to the present exemplary embodiment will be described with reference to FIG. 2. FIG. 2 is a block diagram illustrating an example of the hardware configuration of the server 10 according to the present exemplary embodiment.

As illustrated in FIG. 2, the server 10 according to the present exemplary embodiment includes a central processing unit (CPU) 11, a memory 12 as a temporary storage area, a non-volatile storage unit 13, an input unit 14 such as a keyboard and a mouse, a display unit 15 such as a liquid crystal display, a medium reading and writing (R/W) device 16, and a communication interface (I/F) unit 18. The CPU 11, the memory 12, the storage unit 13, the input unit 14, the display unit 15, the medium reading and writing device 16, and the communication I/F unit 18 are connected to each other via a bus B1. The medium reading and writing device 16 reads out information written in a recording medium 17 and writes information in the recording medium 17.

The storage unit 13 according to the present exemplary embodiment is realized by a hard disk drive (HDD), a solid state drive (SSD), a flash memory, or the like. An information processing program 13A is stored in the storage unit 13 as a storage medium. The information processing program 13A is stored (installed) in the storage unit 13 in a manner that the recording medium 17 in which the information processing program 13A has been written is connected to the medium reading and writing device 16, and the medium reading and writing device 16 reads out the information processing program 13A from the recording medium 17. The CPU 11 reads out the information processing program 13A from the storage unit 13, loads the information processing program 13A into the memory 12, and sequentially executes processes in the information processing program 13A.

A virtual printer management information database 13B is stored in the storage unit 13. The details of the virtual printer management information database 13B will be described later.

Figure 3:
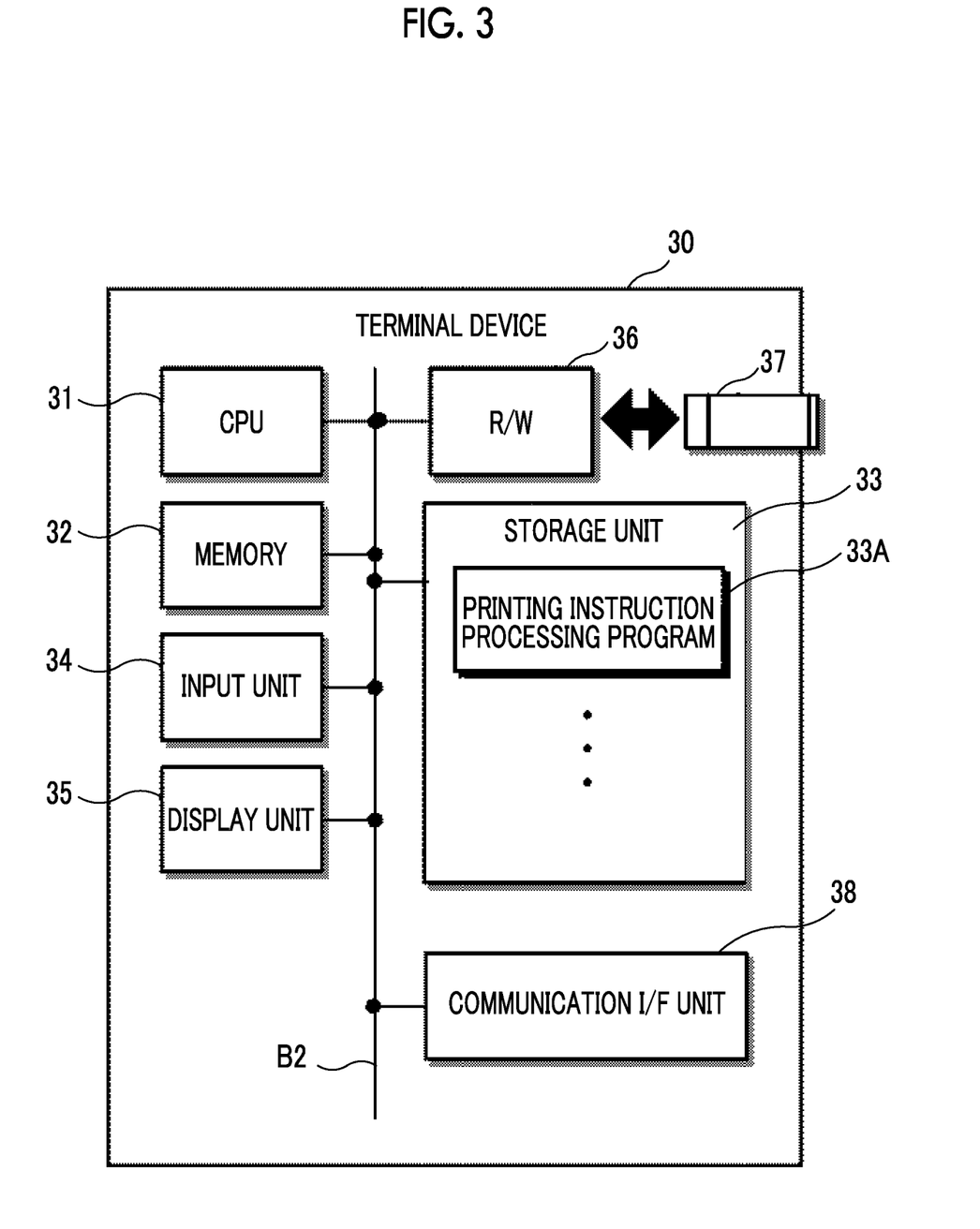
FIG. 3 is a block diagram illustrating an example of a hardware configuration of a terminal device according to the exemplary embodiment of the present disclosure.

Next, the configuration of the terminal device 30 according to the present exemplary embodiment will be described with reference to FIG. 3. FIG. 3 is a block diagram illustrating an example of the hardware configuration of the terminal device 30 according to the present exemplary embodiment.

As illustrated in FIG. 3, the terminal device 30 according to the present exemplary embodiment includes a CPU 31 as a processor, a memory 32 as a temporary storage area, a non-volatile storage unit 33, an input unit 34 such as a keyboard and a mouse, a display unit 35 such as a liquid crystal display, a medium reading and writing (R/W) device 36, and a communication I/F unit 38. The CPU 31, the memory 32, the storage unit 33, the input unit 34, the display unit 35, the medium reading and writing device 36, and the communication I/F unit 38 are connected to each other via a bus B2. The medium reading and writing device 36 reads out information written in a recording medium 37 and writes information in the recording medium 37.

The storage unit 33 according to the present exemplary embodiment is realized by an HDD, an SSD, a flash memory, or the like. A printing instruction processing program 33A is stored in the storage unit 33 as a storage medium. The printing instruction processing program 33A is stored (installed) in the storage unit 33 in a manner that the recording medium 37 in which the printing instruction processing program 33A has been written is connected to the medium reading and writing device 36, and the medium reading and writing device 36 reads out the printing instruction processing program 33A from the recording medium 37. The CPU 31 reads out the printing instruction processing program 33A from the storage unit 33, loads the printing instruction processing program 33A into the memory 32, and sequentially executes processes in the printing instruction processing program 33A.

Figure 4:
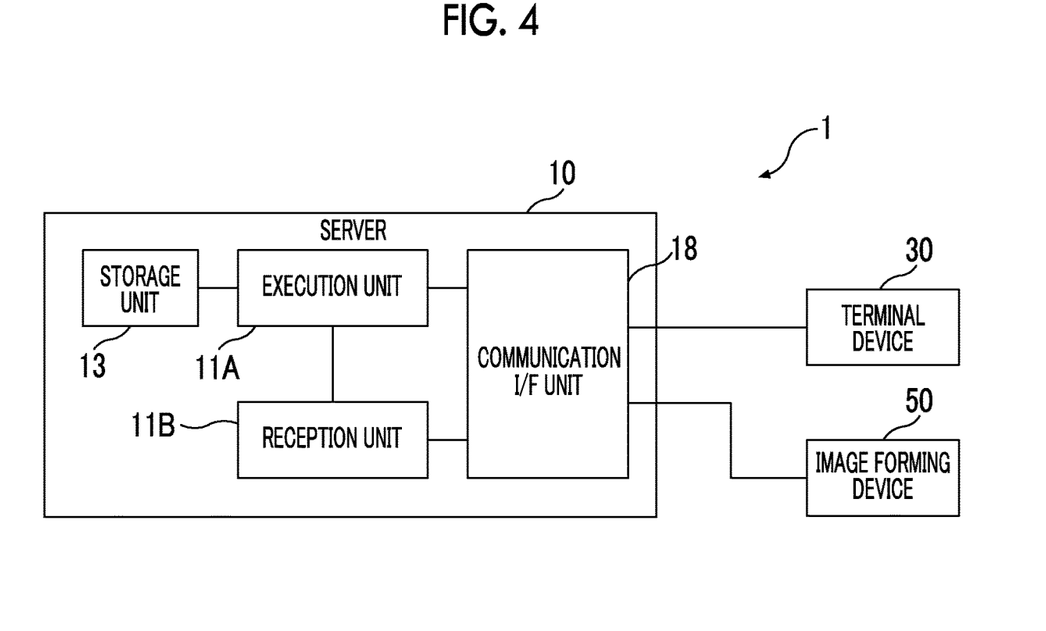
FIG. 4 is a block diagram illustrating an example of a functional configuration of a server according to a first exemplary embodiment of the present disclosure.

Next, the functional configuration of the server 10 according to the present exemplary embodiment will be described with reference to FIG. 4. FIG. 4 is a block diagram illustrating an example of the functional configuration of the server 10 according to the present exemplary embodiment.

As illustrated in FIG. 4, the server 10 includes an execution unit 11A and a reception unit 11B. The CPU 11 in the server 10 executes the information processing program 13A, and thereby the CPU 11 functions as the execution unit 11A and the reception unit 11B.

In a case where the execution unit 11A according to the present exemplary embodiment receives an instruction to apply a setting of a second image forming device 50 (referred to as a "second image forming device" below) to a first image forming device 50 (referred to as a "second image forming device" below), the execution unit 11A executes an application process of applying a setting of a second virtual image forming device (referred to as a "second virtual image forming device" below) to a setting of a first virtual image forming device (referred to as a "first virtual image forming device" below). The first virtual image forming device and the second virtual image forming device correspond to the above-described virtual printer.

Here, the first virtual image forming device is a virtual device of the first image forming device, and is a device having a setting synchronized with the first image forming device. The second virtual image forming device is a virtual device of the second image forming device, and is a device having a setting synchronized with the second image forming device. Thus, with the application process of the execution unit 11A, the setting of the second virtual image forming device applied to the setting of the first virtual image forming device, that is, the setting of the second image forming device is reflected to the first image forming device by the above synchronization.

Further, the execution unit 11A according to the present exemplary embodiment executes a saving process of saving the setting of the first virtual image forming device prior to the execution of the application process. After the first image forming device has ended an image process, the execution unit 11A according to the present exemplary embodiment executes a return process of returning the setting of the first virtual image forming device to the setting saved by the above saving process.

Here, in a case where the return process is executed, the execution unit 11A according to the present exemplary embodiment excludes the setting related to the history of the image process executed by the first image forming device, from the target of the return process. This is to avoid erroneous return of the setting related to the history.

Prior to the execution of the application process, the execution unit 11A according to the present exemplary embodiment executes a verification process of verifying whether or not the setting of the second virtual image forming device can be applied to the setting of the first virtual image forming device. In a case where it is verified that the setting can be applied as a result of the verification process, the execution unit 11A executes the application process.

Here, the execution unit 11A according to the present exemplary embodiment executes a static verification process and a dynamic verification process, as the verification process. In the static verification process, it is verified whether or not the setting of the second image forming device can be applied to the first image forming device. In the dynamic verification process, it is verified whether or not the setting of the second image forming device can be applied in the state of the first image forming device. The present disclosure is not limited to this form. A form in which only one of the static verification process and the dynamic verification process is executed as the above verification process may be made.

Further, in a case where the execution unit 11A according to the present exemplary embodiment verifies that the application is not possible as a result of the verification process, the execution unit 11A executes a presentation process of presenting, to a user, information indicating that the application is not possible. In the present exemplary embodiment, a presentation by the display of the display unit is applied as the presentation by the presentation process, but the present disclosure is not limited to this. For example, a form in which a presentation by printing of the image forming device or a presentation by voice from a voice generation device is applied as the presentation by the presentation process may be made.

Furthermore, in a case where it is verified that applying a portion of the setting is not possible as a result of the verification process, the execution unit 11A according to the present exemplary embodiment selectively executes either a first process of applying only other portions of the setting or a second process of causing the application process not to be executed. Then, the reception unit 11B according to the present exemplary embodiment receives the selection designation for which of the first process and the second process is to be executed. The execution unit 11A executes the process designated by the selection designation received by the reception unit 11B.

Figure 5:
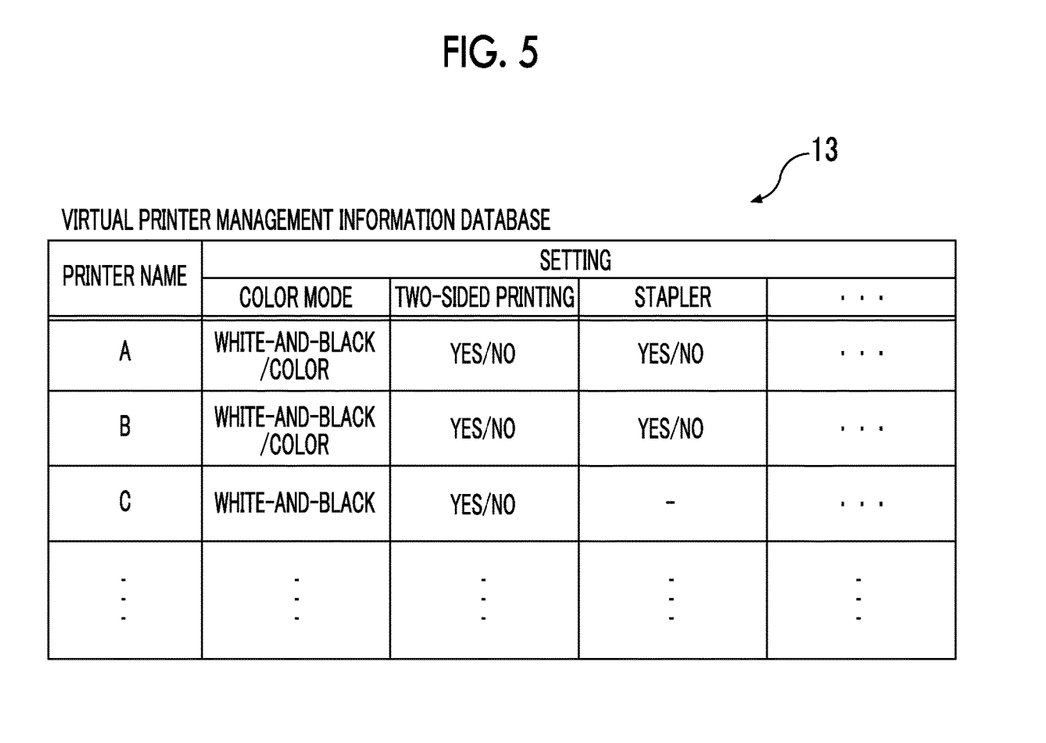
FIG. 5 is a schematic diagram illustrating an example of a configuration of a virtual printer management information database according to the exemplary embodiment of the present disclosure.

Next, the virtual printer management information database 13B according to the present exemplary embodiment will be described with reference to FIG. 5. FIG. 5 is a schematic diagram illustrating an example of the configuration of the virtual printer management information database 13B according to the present exemplary embodiment.

The virtual printer management information database 13B according to the present exemplary embodiment is a database in which information regarding the above-described virtual printer is registered. As illustrated in FIG. 5 as an example, information of a printer name and information of a setting are stored in association with each other.

The printer name is information indicating the name of an image forming device 50 assigned in advance to the image forming device 50 in order to specify the image forming device 50 corresponding to the corresponding virtual printer. The setting is information (referred to as "setting information" below) set in the image forming device 50 corresponding to the corresponding virtual printer.

As illustrated in FIG. 5, the setting information includes information (referred to as "default setting information" below) indicating settings to be applied in a case where image formation is performed, for example, "color mode" for setting whether to apply black-and-white printing or color printing, "two-sided printing" for setting whether to perform two-sided printing, and "stapler" for setting whether or not to stop a stapler. Further, the setting information also includes information (referred to as "history information" below) regarding the history of the image process executed previously by each image forming device 50, for example, what process has been executed by each image forming device 50.

Next, an operation of the information processing system 1 according to the present exemplary embodiment will be described with reference to FIGS. 6 to 10.

Figure 6:
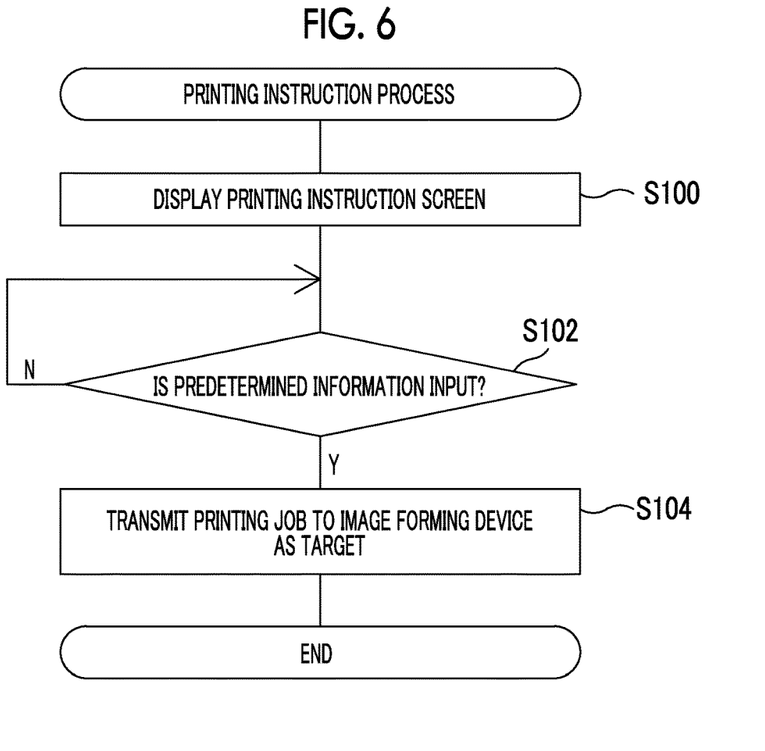
FIG. 6 is a flowchart illustrating an example of a printing instruction process according to the exemplary embodiment of the present disclosure.

First, the operation of the terminal device 30 in a case of executing a printing instruction process will be described with reference to FIGS. 6 to 7. FIG. 6 is a flowchart illustrating an example of the printing instruction process according to the present exemplary embodiment.

In the information processing system 1 according to the present exemplary embodiment, a user of the terminal device 30 (referred to as a "printing instructor" below) instructs to print a printed matter (referred to as a "target printed matter" below) set as a target, by using the terminal device 30. In a case where the printing instructor issues a printing instruction, the CPU 31 in the terminal device 30 executes the printing instruction processing program 33A. Thus, the printing instruction process illustrated in FIG. 6 is executed.

In Step S100 in FIG. 6, the CPU 31 controls the display unit 35 to display a printing instruction screen having a predetermined configuration. In Step S102, the CPU 31 waits until predetermined information is input. FIG. 7 illustrates an example of the printing instruction screen according to the present exemplary embodiment.

Figure 7:
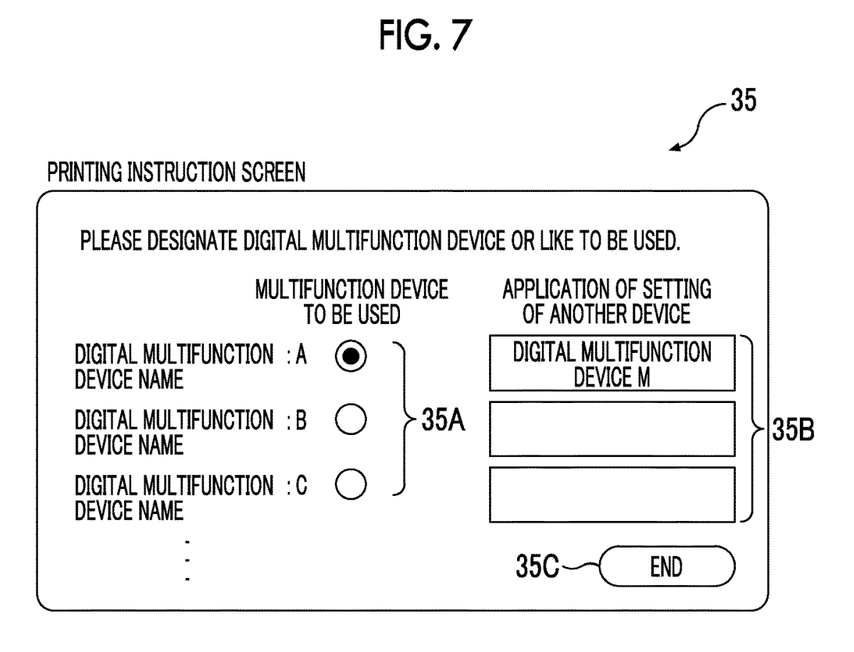
FIG. 7 is a front view illustrating an example of a printing instruction screen according to the exemplary embodiment of the present disclosure.

As illustrated in FIG. 7, a message for urging the designation of an image forming device or the like that performs printing of the target printed matter is displayed on the printing instruction screen according to the present exemplary embodiment. Further, information indicating the name of the image forming device 50 that can be used in the terminal device 30 is displayed on the printing instruction screen according to the present exemplary embodiment. Further, a designation portion 35A for designating an image forming device 50 to be used and an input area 35B for inputting the name of an image forming device 50 having a setting that is intended to be applied to the image forming device 50 are displayed on the printing instruction screen according to the present exemplary embodiment.

In a case where the printing instruction screen illustrated in FIG. 7 is displayed, the printing instructor uses the input unit 34 to designate the designation portion 35A corresponding to the image forming device 50 that prints the target printed matter. In a case where the printing instructor intends to apply the setting of another image forming device 50 to the designated image forming device 50 by using the input unit 34, the printing instructor inputs the name of the other image forming device 50 into the corresponding input area 35B. In a case where the designation or the input of the image forming device 50 is ended, the printing instructor designates an end button 35C by using the input unit 34. In a case where the printing instructor designates the end button 35C, Step S102 is determined to be positive. Thus, the process proceeds to Step S104.

In Step S104, the CPU 31 creates printing job information for the target printed matter. At this time, in a case where the name of the image forming device 50 is input into the corresponding input area 35B by the printing instructor, the CPU 31 creates printing job information including information (referred to as "target device information" below) indicating this image forming device 50 (corresponding to the above-described second image forming device, and referred to as the "second image forming device" below).

The CPU 31 transmits the created printing job information to the image forming device 50 (corresponding to the above-described first image forming device, and referred to as the "first image forming device" below) designated in the designation portion 35A. Then, the CPU 31 ends the present printing instruction process.

In the present exemplary embodiment, as described above, the selection designation of the image forming device 50 to be used and the input of the image forming device 50 to be set are performed through the dedicated screen illustrated in FIG. 7 as an example. The present disclosure is not limited to this. For example, a form in which the above designation is performed by using a standard function provided in a browser may be made.

Upon receiving the printing job information, the first image forming device temporarily stores the received printing job information. The first image forming device performs login authentication for the printing instructor, and then performs printing of a printed matter using the received printing job information, in response to an instruction by the printing instructor.

Here, in a case where the printing job information as a printing target includes the target device information, the first image forming device according to the present exemplary embodiment transmits the target device information to the server 10 prior to printing of the printed matter.

Figure 8:
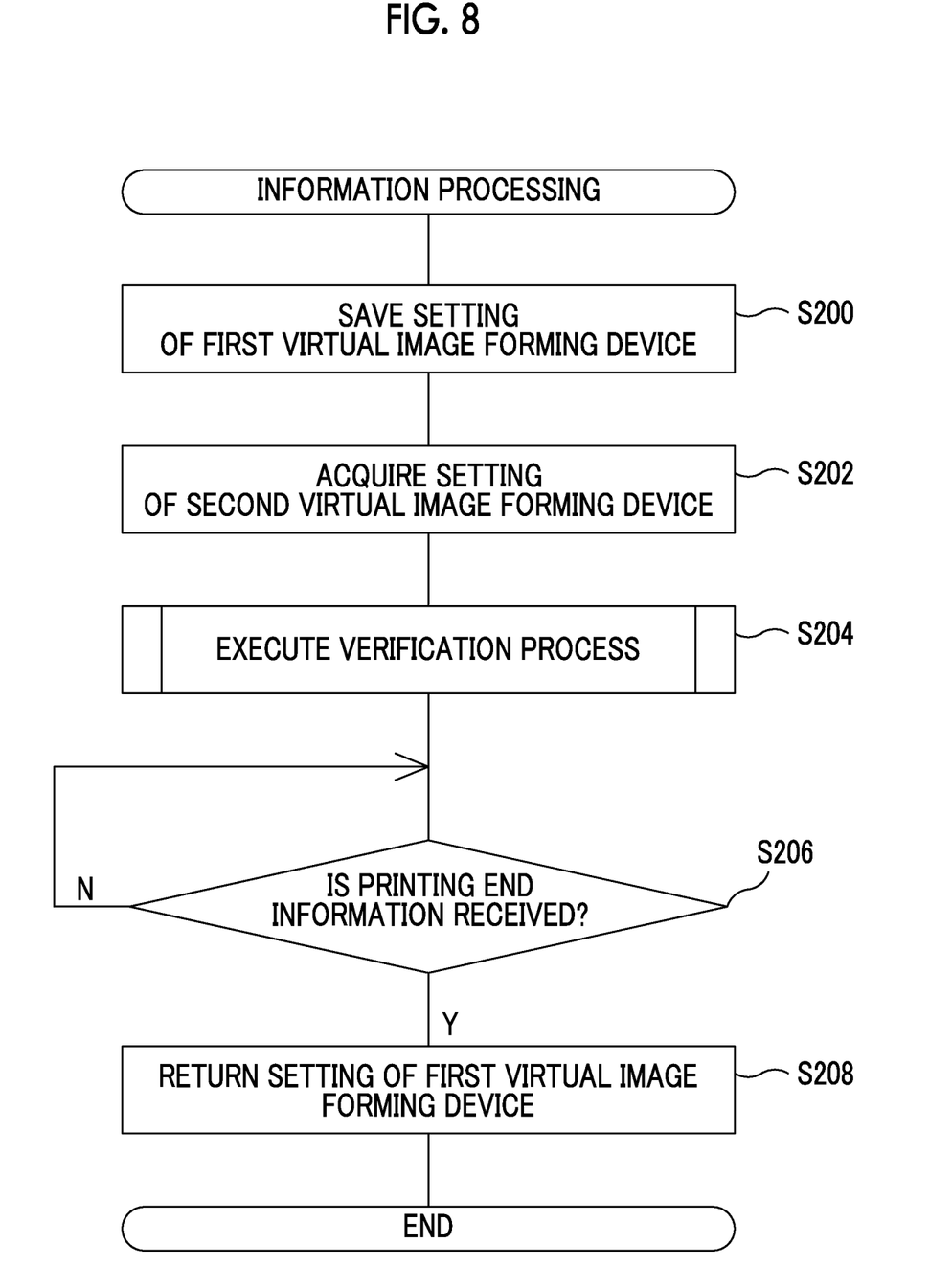
FIG. 8 is a flowchart illustrating an example of information processing according to the first exemplary embodiment of the present disclosure.
Figure 9:
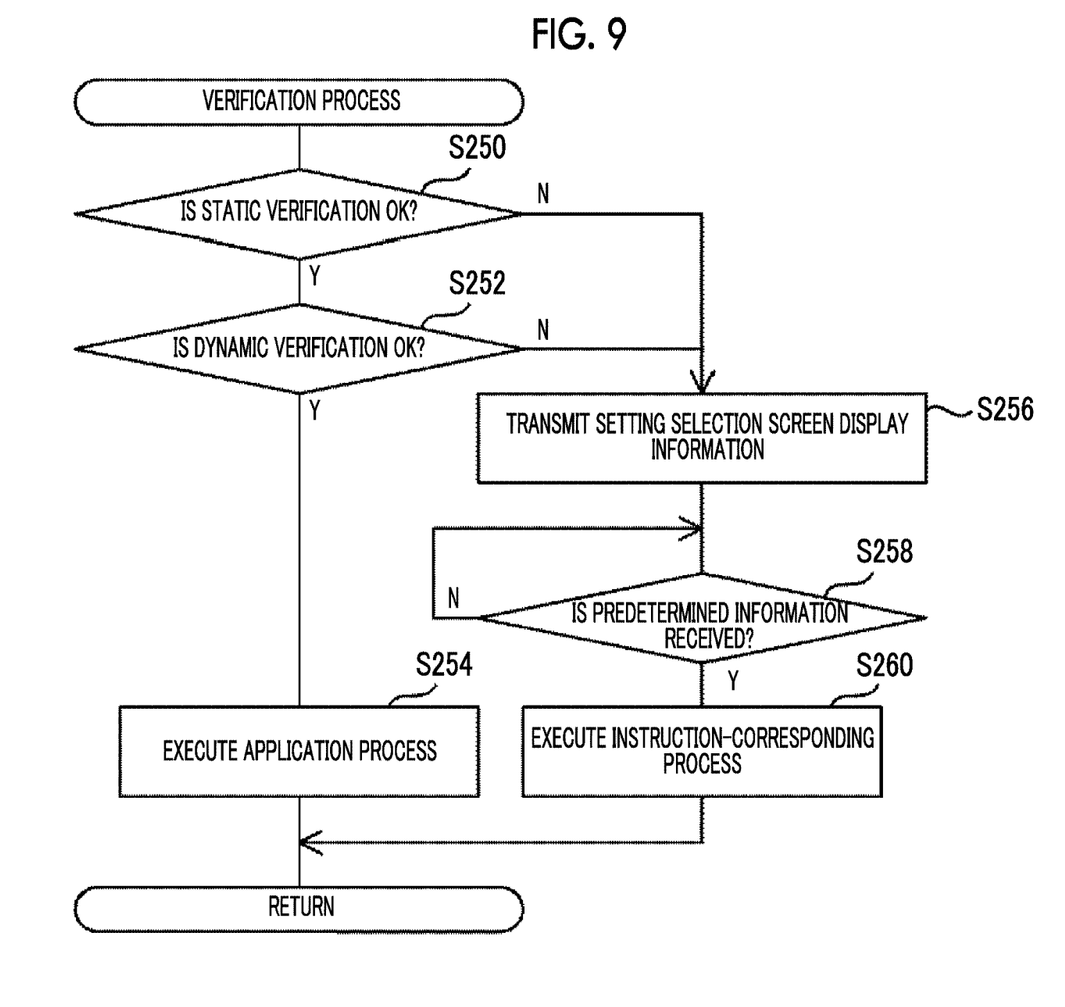
FIG. 9 is a flowchart illustrating an example of a verification process according to the first exemplary embodiment of the present disclosure.

Next, the operation of the server 10 in a case of executing information processing will be described with reference to FIGS. 8 to 10. FIG. 8 is a flowchart showing an example of information processing according to the present embodiment, and FIG. 9 is a flowchart showing an example of verification process according to the present exemplary embodiment.

Regarding the information processing according to the present exemplary embodiment, the information processing illustrated in FIG. 8 is performed in a manner the CPU 11 in the server 10 executes the information processing program 13A in a case where the server 10 receives target device information from a certain image forming device 50.

In Step S200 in FIG. 8, the CPU 11 executes the above-described saving process by reading out information (referred to as "first setting information" below) indicating the setting of the virtual printer (corresponding to the above-described first virtual image forming device, and referred to as the "first virtual image forming device" below) corresponding to the first image forming device that is a transmission source of the target device information, from the virtual printer management information database 13B, and storing the read-out information in the storage unit 13 again. At this time, the CPU 11 stores only the default setting information among pieces of information indicating the setting, as the first setting information.

In Step S202, the CPU 11 reads out information (referred to as "second setting information" below) indicating the setting of the virtual printer (corresponding to the above-described second virtual image forming device, and referred to as the "second virtual image forming device" below) corresponding to the second image forming device indicated by the received target device information, from the virtual printer management information database 13B. At this time, the CPU 11 reads out only the default setting information among the pieces of information indicating the setting, as the second setting information.

In Step S204, the CPU 11 executes the verification process illustrated in FIG. 9 as an example, by using the first setting information and the second setting information. In the verification process, it is verified whether or not the setting of the second virtual image forming device can be applied to the setting of the first virtual image forming device.

In Step S250 in FIG. 9, the CPU 11 executes the static verification process described above, and determines whether or not the verification result by the static verification process has no problem. In a case where Step S250 is determined to be positive, the CPU 11 causes the process to proceed to Step S252. In the present exemplary embodiment, a process of determining whether or not setting items indicated by the first setting information include all setting items identical to setting items indicated by the second setting information is applied as the static verification process. The present disclosure is not limited to this. For example, a form in which a process of determining whether or not the setting items indicated by the first setting information include a setting item that can be substituted with a setting item although this setting item different from the setting items indicated by the first setting information is included in the setting items indicated by the second setting information is applied as the static verification process may be made.

In Step S252, the CPU 11 executes the above-described dynamic verification process, and determines whether or not the verification result by the dynamic verification process has no problem. In a case where Step S252 is determined to be positive, the CPU 11 causes the process to proceed to Step S254. In the present exemplary embodiment, a process of determining whether or not all optional items targeted in the setting items indicated by the second setting information are mounted in the first image forming device is applied as the dynamic verification process, but the present disclosure is not limited to this. For example, a form in which a process of determining whether or not a substitute for optional items is attached to the first image forming device although some of optional items targeted by the setting items indicated by the second setting information are temporarily detached from the first image forming device is applied as the dynamic verification process may be made.

In Step S254, the CPU 11 overwrites the first setting information in the virtual printer management information database 13B with the second setting information, thereby replacing the first setting information with the second setting information. Then, the CPU 11 ends the present verification process. By replacing the setting information, the above-described application process is executed.

On the other hand, in a case where either Step S250 or Step S252 is determined to be negative, the process proceeds to Step S256. In Step S256, the CPU 11 displays a setting selection screen for the first image forming device by transmitting information that can display the setting selection screen having a predetermined configuration to the first image forming device. In Step S258, the CPU 11 waits until predetermined information is received from the first image forming device. FIG. 10 illustrates an example of the setting selection screen according to the present exemplary embodiment.

Figure 10:
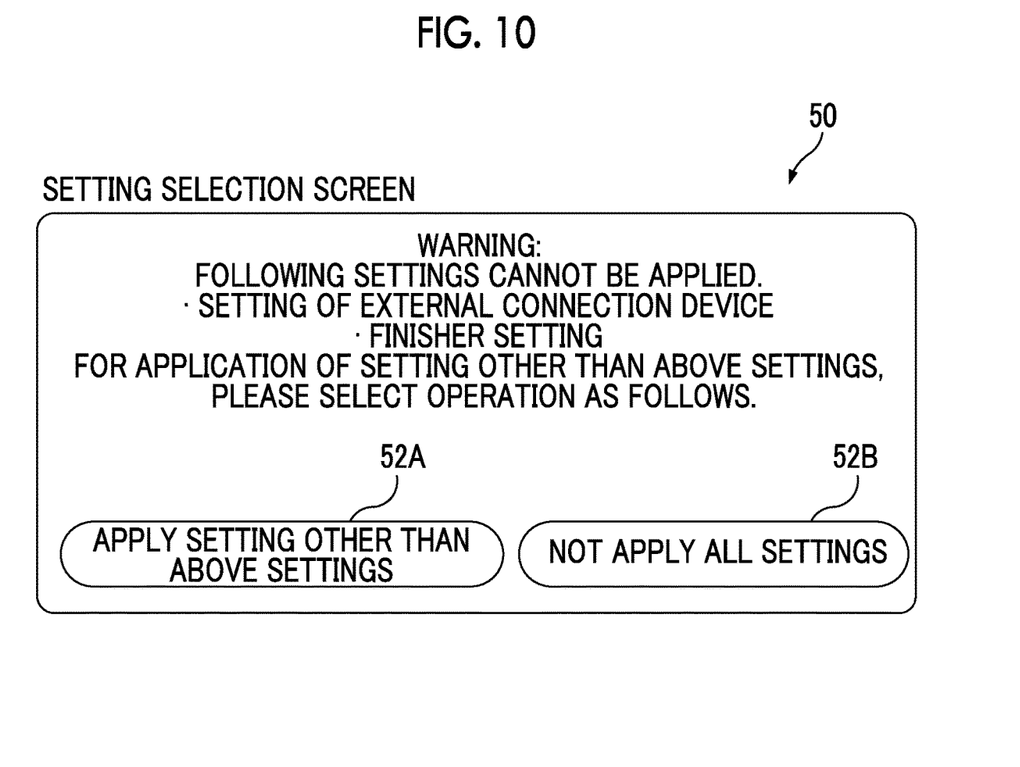
FIG. 10 is a front view illustrating an example of a setting selection screen according to the exemplary embodiment of the present disclosure.

As illustrated in FIG. 10, information indicating a problem found by the static verification process or the dynamic verification process is displayed on the setting selection screen according to the present exemplary embodiment. Further, information for urging selection designation of whether to apply the setting other than the setting corresponding to the displayed problem (corresponding to the first process, and referred to as the "first process" below) or not apply all the settings (corresponding to the second process, and referred to as the "second process" below) is displayed on the setting selection screen according to the present exemplary embodiment. Further, a first button 52A designated in a case where the first process is adopted and a second button 52B designated in a case where the second process is adopted are displayed on the setting selection screen according to the present exemplary embodiment.

In a case where the setting selection screen illustrated in FIG. 10 is displayed, the printing instructor uses the input unit in the first image forming device to designate the first button 52A in a case where the first process is adopted, and designate the second button 52B in a case where the second process is adopted. In a case where the printing instructor designates the first button 52A or the second button 52B, the first image forming device transmits, to the server 10, information (referred to as "adoption process information" below) indicating the process corresponding to the designated button. In a case where the adoption process information is received from the first image forming device, Step S258 is determined to be positive. Thus, the process proceeds to Step S260.

In Step S260, the CPU 11 executes the process indicated by the received adoption process information, and then ends the present verification process. In a case where the verification process is ended, the process returns to Step S206 of the information processing.

With the above processes, at least some of the settings of the first virtual image forming device are replaced with at least some of the settings of the second virtual image forming device, or the settings are not replaced.

Thus, in a case where the above settings are replaced, the settings of the first image forming device are subsequently synchronized with the settings of the first virtual image forming device. Thus, at least some of the settings of the second image forming device are reflected to the first image forming device.

Then, as described above, the printing instructor instructs the first image forming device to print the target printed matter. Thus, the first image forming device performs printing of the target printed matter. In a case where the printing of the target printed matter is ended, the first image forming device transmits, to the server 10, information indicating that the printing has been ended (referred to as "printing end information" below).

Therefore, in Step S206, the CPU 11 waits until the print end information is received. In Step S208, the CPU 11 returns the first setting information to the original information by overwriting the information indicating the setting of the first virtual image forming device with the first setting information saved by the process in Step S200. Then, the CPU 11 ends the present information processing. By returning the setting information, the above-described return process is executed.

Second Exemplary Embodiment

Figure 11:
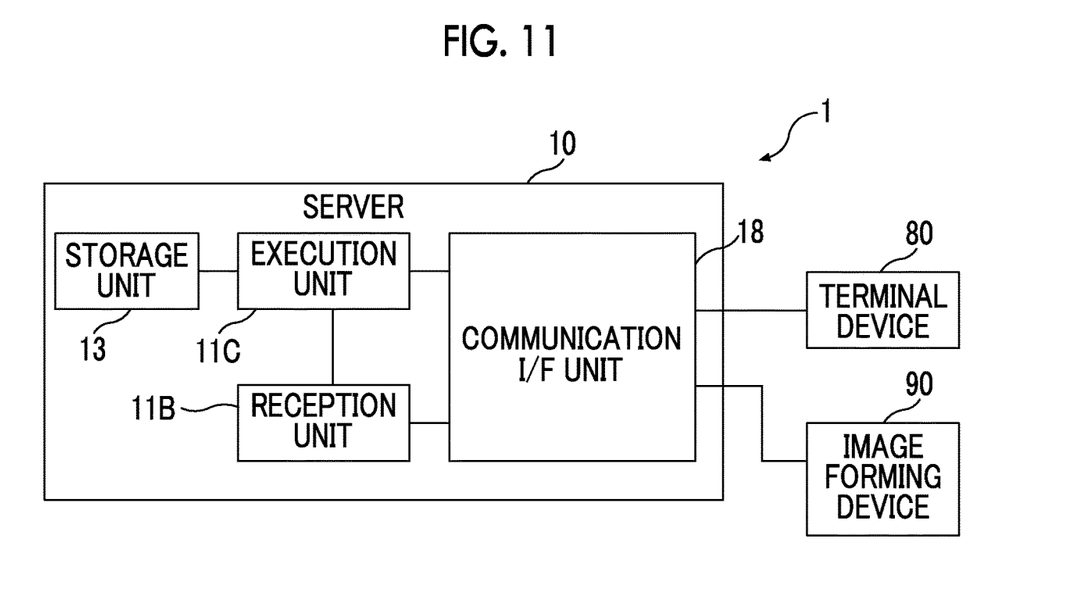
FIG. 11 is a block diagram illustrating an example of a functional configuration of a server according to a second exemplary embodiment of the present disclosure.

In the present exemplary embodiment, a form example in which a duplication creation process of creating a duplication of the first virtual image forming device is executed will be described. Since the overall configuration of the information processing system 1 to the present exemplary embodiment is substantially similar to the overall configuration in the first embodiment, here, first, the functional configuration of a server 10 according to the present exemplary embodiment will be described with reference to FIG. 11. FIG. 11 is a block diagram illustrating an example of the functional configuration of the server 10 according to the present exemplary embodiment. The identical components to the components illustrated in FIG. 4 are denoted by the identical reference signs to the reference signs in FIG. 4, and the description will not be repeated.

As illustrated in FIG. 11, the server 10 according to the present exemplary embodiment is different from the server 10 according to the first exemplary embodiment only in that an execution unit 11C is applied instead of the execution unit 11A.

That is, the execution unit 11C according to the present exemplary embodiment executes the duplication creation process of creating a duplication of the first virtual image forming device prior to the execution of the application process, in addition to the processes substantially similar to the processes of the execution unit 11A according to the first exemplary embodiment.

Figure 12:
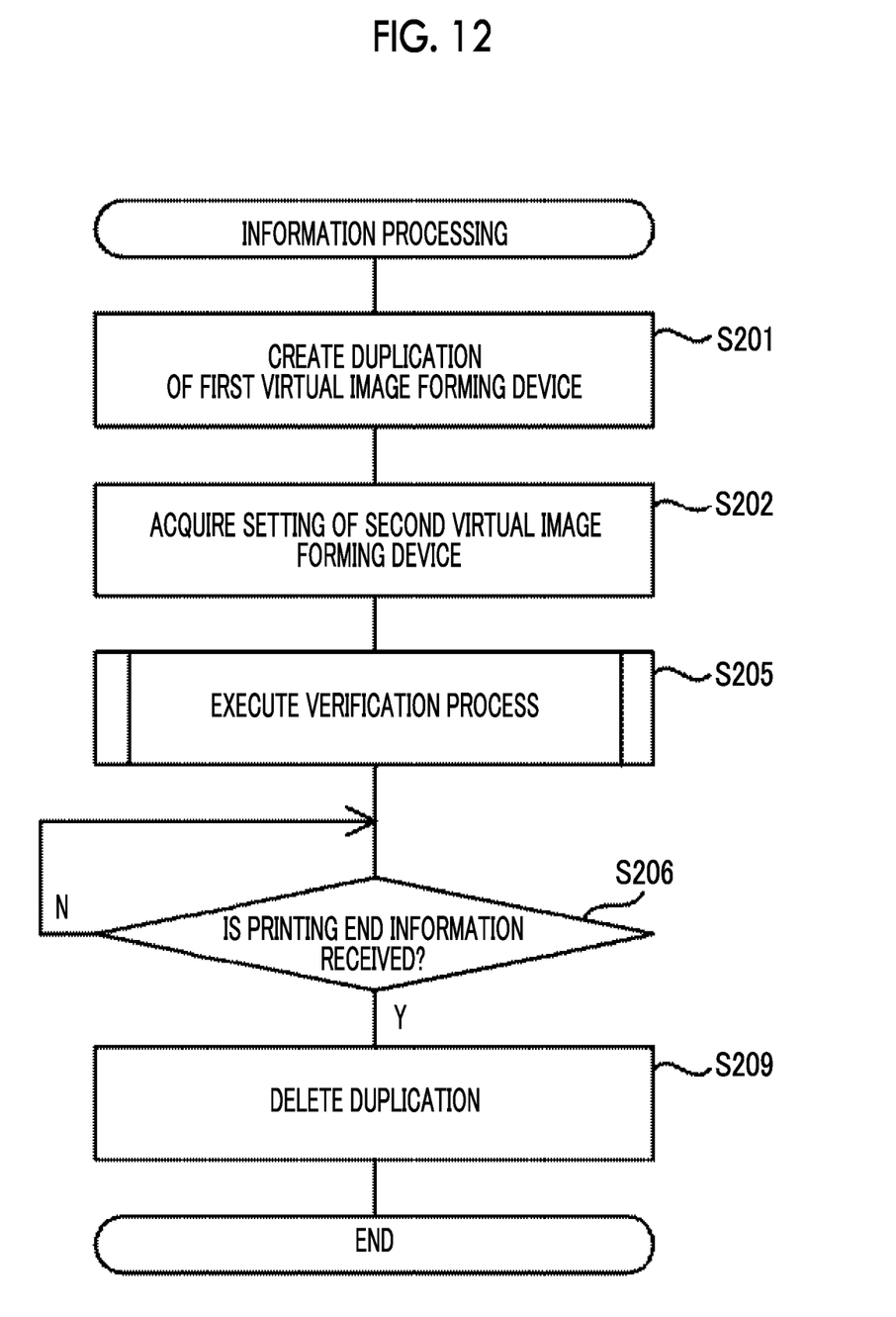
FIG. 12 is a flowchart illustrating an example of information processing according to the second exemplary embodiment of the present disclosure.
Figure 13:
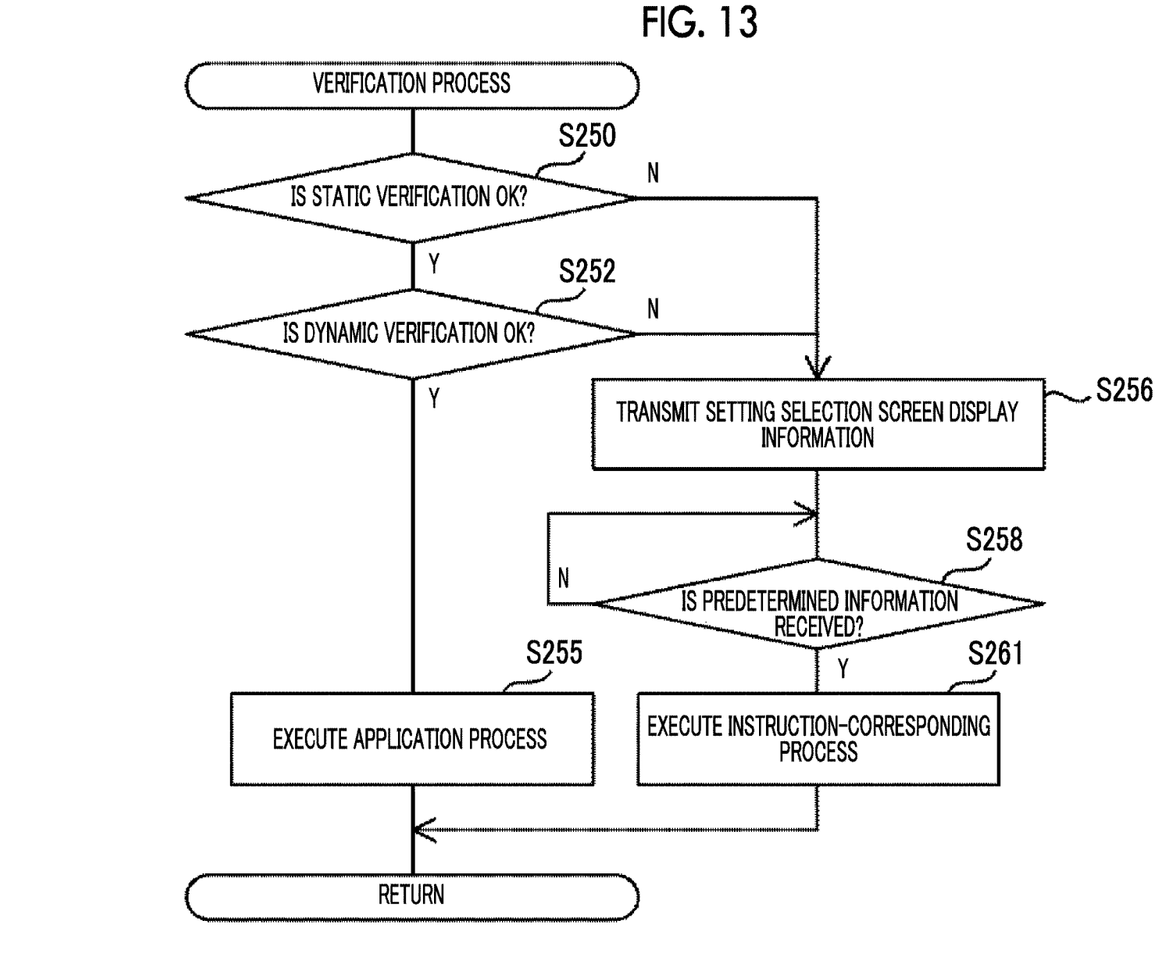
FIG. 13 is a flowchart illustrating an example of a verification process according to the second exemplary embodiment of the present disclosure.

Next, the operation of an information processing system 1 according to the present exemplary embodiment will be described. Since the operation of a terminal device 30 in a case of executing the printing instruction process is identical to the operation in the first exemplary embodiment, the description thereof will be omitted here. The operation of the server 10 in a case where information processing is performed will be described below with reference to FIGS. 12 to 13. FIG. 12 is a flowchart illustrating an example of the information processing according to the present exemplary embodiment, and FIG. 13 is a flowchart illustrating an example of a verification process according to the present exemplary embodiment. The steps in which the identical processing is performed illustrated in FIGS. 8 and 9 are denoted by the step numbers identical to the step numbers in FIGS. 8 and 9, and the description thereof will not be repeated.

As illustrated in FIG. 12, the information processing according to the present exemplary embodiment is different from the information processing according to the first exemplary embodiment in that the process of Step S201 is applied to the information processing according to the first exemplary embodiment instead of the process of Step S200, and the process of Step S205 is applied instead of the process of Step S204, and the process of Step S209 is applied instead of the process of Step S208.

That is, in Step S201 of the information processing according to the present exemplary embodiment, the CPU 11 executes the duplication creation process of creating a duplication of the first virtual image forming device instead of the saving process.

That is, in the present exemplary embodiment, the duplication creation process is executed by storing the information indicating the first virtual image forming device itself (referred to as "first virtual image forming device information" below) in the storage unit 13 again.

Further, in Step S205, the CPU 11 executes a verification process different from the verification process in the first exemplary embodiment, which is illustrated in FIG. 13 as an example. As illustrated in FIG. 13, the verification process according to the present exemplary embodiment is different from the verification process in the first exemplary embodiment, in that the process of Step S255 is applied instead of the process of Step S254, and the process of Step S261 is applied instead of the process of Step S260.

That is, in Step S255 of the verification process according to the present exemplary embodiment, the CPU 11 replaces the first setting information in the first virtual image forming device information with the second setting information by overwriting the information indicating the setting of the first virtual image forming device information duplicated by the duplication creation process with the second setting information.

Further, in Step S261, the CPU 11 executes the process indicated by the adoption process information received from the first image forming device, and then ends the verification process. In addition, a point that the process of Step S261 according to the present exemplary embodiment targets the setting of the duplicated first virtual image forming device information is different from a point that the process of Step S260 according to the first exemplary embodiment targets the setting of the first virtual image forming device itself.

On the other hand, in Step S209 of the information processing, the CPU 11 erases the duplication created by the process of Step S201, and then ends the present information processing.

In a case where the duplicated first virtual image forming device information exists, the first image forming device according to the present exemplary embodiment synchronizes the setting with the first virtual image forming device information.

With the above processing, it is possible to reflect the setting of the second image forming device to the first image forming device without changing the setting of the first virtual image forming device. Therefore, in the information processing system 1 according to the present exemplary embodiment, even in a case where the first image forming device is shared by a plurality of printing instructors, it is possible to reflect the setting of the second image forming device to the first image forming device without limiting the time of use.

In each of the above exemplary embodiments, the case where the present invention is applied to the cloud print service has been described, but the present disclosure is not limited to this. For example, a form in which the present invention is applied to a print service that does not use a cloud server, for example, a network server in an organization may be made.

Further, in each of the above exemplary embodiments, the case where the virtual printer management information database 13B is registered in the server 10 has been described, but the present disclosure is not limited to this. For example, a form in which the virtual printer management information database 13B is registered in any image forming device 50 or another device accessible from any image forming device 50 may be made.

Further, in each of the above exemplary embodiments, the case where the image forming device is applied as the image processing device in the present disclosure has been described, but the present disclosure is not limited thereto. For example, a form in which another image processing device such as an image scanning device having only an image scanning function or an image transmission device having an image transmission function in addition to the image scanning function is applied as the image processing device of the present disclosure may be made.

Although the exemplary embodiments have been described above, the technical scope of the present invention is not limited to the scope described in the above exemplary embodiments. Various changes or improvements may be made to the above exemplary embodiments without departing from the gist of the invention, and the changed or improved forms are also included in the technical scope of the invention.

Further, each of the above exemplary embodiments does not limit the invention according to the claim, and not all combinations of characteristics described in the exemplary embodiments are not limited to being required for the means for addressing the invention. The above-described exemplary embodiments include inventions at various stages, and various inventions are extracted by combining a plurality of disclosed constituent requirements. Even though some constituent requirements are deleted from all the constituent requirements described in the exemplary embodiments, a configuration in which some of the constituent requirements are deleted may be extracted as an invention as long as the effect is obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass s one processor or plural processors in collaboration which are located physically apart from each other but may work cooperatively. The order of operations of the processor is not limited to one described in the embodiments above, and may be changed.

Further, in each of the above exemplary embodiments, the case where various processes are realized by a software configuration using a computer by executing a program has been described, but the present invention is not limited to this. For example, a form in which various processes are realized by a combination of a hardware configuration and a software configuration may be made.

In addition, the configurations of the server 10 and the terminal device 30 described in each of the above exemplary embodiments are examples. A unnecessary portion may be deleted or a new portion may be added, within a range without departing from the gist of the present invention.

Further, the flow of various processes described in each of the above exemplary embodiments is also an example. An unnecessary step may be deleted, a new step may be added, or the processing order may be changed, within a range without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      based on a determination to apply a setting of a second image processing device to a setting of a first image processing device, execute an application process of applying a setting of a second virtual image processing device to a setting of a first virtual image processing device, the first virtual image processing device being a virtual device of the first image processing device and being a device having the setting synchronized with the setting of the first image processing device, and the second virtual image processing device being a virtual device of the second image processing device and being a device having the setting synchronized with the setting of the second image processing device.

2. The information processing apparatus according to claim 1, wherein the processor is configured to:
   prior to the execution of the application process, execute a saving process of saving the setting of the first virtual image processing device.

3. The information processing apparatus according to claim 2, wherein the processor is configured to:
   after an image process by the first image processing device has been ended, execute a return process of returning the setting of the first virtual image processing device to the setting saved by the saving process.

4. The information processing apparatus according to claim 3, wherein the processor is configured to:
   based on a determination that the return process is executed, exclude a setting related to a history of the image process executed by the first image processing device, from a target of the return process.

5. The information processing apparatus according to claim 4, wherein the processor is configured to:
   prior to the execution of the application process, execute a duplication creation process of creating a duplication of the first virtual image processing device.

6. The information processing apparatus according to claim 4, wherein the processor is configured to:
   prior to the execution of the application process, execute a verification process of verifying whether or not the setting of the second virtual image processing device is applicable to the setting of the first virtual image processing device, and
   based on a determination that the application is possible as a result of the verification process, execute the application process.

7. The information processing apparatus according to claim 3, wherein the processor is configured to:
   prior to the execution of the application process, execute a duplication creation process of creating a duplication of the first virtual image processing device.

8. The information processing apparatus according to claim 3, wherein the processor is configured to:
   prior to the execution of the application process, execute a verification process of verifying whether or not the setting of the second virtual image processing device is applicable to the setting of the first virtual image processing device, and
   based on a determination that the application is possible as a result of the verification process, execute the application process.

9. The information processing apparatus according to claim 2, wherein the processor is configured to:
prior to the execution of the application process, execute a duplication creation process of creating a duplication of the first virtual image processing device.

10. The information processing apparatus according to claim 9, wherein the processor is configured to:
prior to the execution of the application process, execute a verification process of verifying whether or not the setting of the second virtual image processing device is applicable to the setting of the first virtual image processing device, and
based on a determination that the application is possible as a result of the verification process, execute the application process.

11. The information processing apparatus according to claim 2, wherein the processor is configured to:
prior to the execution of the application process, execute a verification process of verifying whether or not the setting of the second virtual image processing device is applicable to the setting of the first virtual image processing device, and
based on a determination that the application is possible as a result of the verification process, execute the application process.

12. The information processing apparatus according to claim 1, wherein the processor is configured to:
prior to the execution of the application process, execute a duplication creation process of creating a duplication of the first virtual image processing device.

13. The information processing apparatus according to claim 12, wherein the processor is configured to:
prior to the execution of the application process, execute a verification process of verifying whether or not the setting of the second virtual image processing device is applicable to the setting of the first virtual image processing device, and
based on a determination that the application is possible as a result of the verification process, execute the application process.

14. The information processing apparatus according to claim 1, wherein the processor is configured to:
prior to the execution of the application process, execute a verification process of verifying whether or not the setting of the second virtual image processing device is applicable to the setting of the first virtual image processing device, and
based on a determination that the application is possible as a result of the verification process, execute the application process.

15. The information processing apparatus according to claim 14, wherein the processor is configured to:
execute, as the verification process, at least one of a static verification process of verifying whether or not the setting of the second virtual image processing device is allowed to be applied to the first virtual image processing device, or a dynamic verification process of verifying whether or not the setting of the second virtual image processing device is allowed to be applied in a state of the first virtual image processing device.

16. The information processing apparatus according to claim 14, wherein the processor is configured to:
based on a determination that the application is not possible as a result of the verification process, execute a presentation process of presenting, to a user, information indicating that the application is not possible.

17. The information processing apparatus according to claim 14, wherein the processor is configured to:
based on a determination that applying a portion of the setting is not possible as a result of the verification process, selectively execute either a first process of applying only other portions of the setting or a second process of causing the application process not to be executed.

18. The information processing apparatus according to claim 17, wherein the processor is configured to:
receive selection designation for which of the first process and the second process is to be executed, and
execute a process designated by the received selection designation.

19. A non-transitory computer readable medium storing an information processing program causing a computer to execute a process comprising:
executing, based on a determination to apply a setting of a second image processing device to a setting of a first image processing device, an application process of applying a setting of a second virtual image processing device to a setting of a first virtual image processing device, the first virtual image processing device being a virtual device of the first image processing device and being a device having the setting synchronized with the setting of the first image processing device, and the second virtual image processing device being a virtual device of the second image processing device and being a device having the setting synchronized with the setting of the second image processing device.

20. An information processing method comprising:
executing, based on a determination to apply a setting of a second image processing device to a setting of a first image processing device is received, an application process of applying a setting of a second virtual image processing device to a setting of a first virtual image processing device, the first virtual image processing device being a virtual device of the first image processing device and being a device having the setting synchronized with the setting of the first image processing device, and the second virtual image processing device being a virtual device of the second image processing device and being a device having the setting synchronized with the setting of the second image processing device.

* * * * *